(12) United States Patent
Van et al.

(10) Patent No.: US 9,614,567 B2
(45) Date of Patent: Apr. 4, 2017

(54) SYSTEMS AND METHODS FOR RECOVERING FROM STALLS ON A MOBILE DEVICE

(71) Applicant: QUALCOMM Incorporated, San Diego, CA (US)

(72) Inventors: Hieu Trung Van, Kingston Upon Thames (GB); Abeezar Burhan, Middlesex (GB); Raghav Agarwal, Farnborough (GB)

(73) Assignee: QUALCOMM Incorporated, San Diego, CA (US)

( * ) Notice: Subject to any disclaimer, the term of this patent is extended or adjusted under 35 U.S.C. 154(b) by 98 days.

(21) Appl. No.: 14/662,661

(22) Filed: Mar. 19, 2015

(65) Prior Publication Data

US 2016/0278043 A1 Sep. 22, 2016

(51) Int. Cl.
| | | |
|---|---|---|
| *H04W 4/00* | (2009.01) | |
| *H04B 1/3816* | (2015.01) | |
| *H04W 76/06* | (2009.01) | |
| *H04L 12/823* | (2013.01) | |
| *H04L 1/00* | (2006.01) | |
| *H04L 1/18* | (2006.01) | |
| *H04L 12/807* | (2013.01) | |
| *H04L 12/801* | (2013.01) | |

(52) U.S. Cl.
CPC ............ *H04B 1/3816* (2013.01); *H04L 1/00* (2013.01); *H04L 1/187* (2013.01); *H04L 1/1832* (2013.01); *H04L 47/32* (2013.01); *H04W 76/06* (2013.01); *H04L 47/12* (2013.01); *H04L 47/14* (2013.01); *H04L 47/27* (2013.01); *H04L 47/34* (2013.01)

(58) Field of Classification Search
None
See application file for complete search history.

(56) References Cited

U.S. PATENT DOCUMENTS

| | | | |
|---|---|---|---|
| 7,525,908 B2 | 4/2009 | Olsson et al. | |
| 7,693,126 B2 * | 4/2010 | Cayla | H04L 1/1685 370/235 |

(Continued)

FOREIGN PATENT DOCUMENTS

| | | |
|---|---|---|
| EP | 2215761 A1 | 8/2010 |
| EP | 2301180 A1 | 3/2011 |

OTHER PUBLICATIONS

International Search Report and Written Opinion—PCT/US2016/018927—ISA/EPO—May 9, 2016.

*Primary Examiner* — Chi H Pham
*Assistant Examiner* — Fahmida Chowdhury
(74) *Attorney, Agent, or Firm* — The Marbury Law Group, PLLC (57) ABSTRACT

Various embodiments provide systems and methods for recovering from a stall on a mobile communication device. A mobile communication device may receive a data block from a network through a communications channel, where the data block has a block sequence number. The mobile communication may determine whether the block sequence number of the data block is within a receive window and increment a stall counter when the block sequence number is outside of the receive window. The mobile communication device may perform an abnormal release from the communications channel when the stall counter reaches a threshold.

25 Claims, 6 Drawing Sheets

(56) References Cited

U.S. PATENT DOCUMENTS

| | | | |
|---|---|---|---|
| 8,457,048 B2 | 6/2013 | Venkob et al. | |
| 8,589,752 B2 | 11/2013 | David et al. | |
| 8,724,480 B2 | 5/2014 | Yi et al. | |
| 2003/0012212 A1* | 1/2003 | Earnshaw | H04L 1/1621 370/428 |
| 2003/0169741 A1 | 9/2003 | Torsner et al. | |
| 2005/0100048 A1 | 5/2005 | Chun et al. | |
| 2010/0227608 A1 | 9/2010 | Avadhanam | |
| 2010/0278105 A1* | 11/2010 | Diachina | H04W 28/10 370/328 |
| 2010/0332934 A1* | 12/2010 | Hole | H04L 1/1607 714/748 |
| 2013/0039190 A1 | 2/2013 | Hole | |
| 2013/0070789 A1* | 3/2013 | Hara | G06F 15/17375 370/474 |

* cited by examiner

SYSTEMS AND METHODS FOR RECOVERING FROM STALLS ON A MOBILE DEVICE

BACKGROUND

Mobile communication devices such as cellular phones or smart phones send and receive data through wireless communications channels. Mobile communication devices and the base stations of a cellular network may communicate data using a temporary block flow (TBF) connection. A TBF is a physical connection used by two radio resource entities, such as a mobile communication device and a base station, to support the unidirectional transfer of protocol data units on packet data physical channels. A TBF is temporary and maintained only for the duration of the data transfer, which is until there are no more data blocks to be transmitted. Once all data blocks buffered for transfer are sent to the mobile communication device, the TBF is released at both ends of the communications channel. Each TBF is assigned a temporary flow identifier (TFI) that uniquely identifies the TBF and the sender on a packet data physical channel.

The data transmitted over a TBF is arranged into a number of data blocks, with each block assigned a unique block sequence number (BSN). The BSN determines the order in which the data blocks should be transmitted such that blocks with sequential BSNs are transmitted sequentially. The mobile communication device has a receive window, which is a moving range of BSNs for data blocks that the mobile communication device expects from the network. For example, at the beginning of a TBF, the receive window may include BSNs 0 through 1024. After the mobile communication device receives data blocks numbered 0 through 9, the receive window may slide over to BSN range 10-1034. The network may also send control messages to prepare the mobile communication device for a change in the TBF or to end the current TBF and start a new TBF. One such control message is a TBF release message along with a new downlink assignment message, which ends the current TBF and initiates another TBF using the same TFI. Another control message is a timeslot reconfigure message that assigns a new TFI to the current TBF.

Data reception on a mobile communication device may be subject to errors caused by interference with the wireless signal. For example, there may be ambient radio interference or physical objects that impede transmission of the TBF from a base station to a mobile communication device. The mobile communication device may also have more than one radio frequency (RF) resource, such as a multi-subscriber identity module (multi-SIM) multi-active (MSMA) communication device, in which case transmission by one RF resource may interfere with the reception of the other RF resource. Thus, mobile communication devices may not receive one or more data blocks or control messages sent by a network. This is especially problematic if the mobile communication device misses control messages indicating an end or change to a TBF. For example, a mobile communication device may not receive a TBF release and new downlink assignment. When this occurs, the mobile communication device continues to operate as if the current TBF has not ended and waits for a data block with a BSN that is within the expected receive window. The mobile communication device ignores any received data blocks that are not within the expected receive window ("out-of-window data blocks"). Thus, the mobile communication device will ignore any data blocks sent through a new TBF, which would start with a BSN of zero. This situation causes a stall in the mobile communication device, which may last for a long time before the stall is corrected. A stall may also occur if the mobile communication device misses a timeslot reconfigure message because the mobile communication device does not switch to the new TFI. The data blocks sent by the network using the old TFI are intended for another device, so the mobile communication device again receives out-of-window data blocks. Thus, a stall may persist for an extended period.

SUMMARY

Various embodiments provide methods, devices, and non-transitory processor-readable storage media for recovering from a stall on a mobile communication device. Various embodiment methods may include receiving, on a mobile communication device, a data block from a network through a communications channel, where the data block has a block sequence number, determining whether the block sequence number of the data block is within a receive window, incrementing a stall counter when the block sequence number is outside of the receive window, and performing an abnormal release from the communications channel when the stall counter reaches a threshold.

In some embodiments, the method may further include setting the stall counter to zero when the block sequence number is within the receive window. In some embodiments, the method may further include setting the stall counter to zero when the block sequence number is within a tolerance value of the receive window. In some embodiments, the method may further include incrementing the stall counter when the block sequence number is outside of a tolerance value of the receive window. In some embodiments, the communications channel may be a temporary block flow. In some embodiments, the method may further include receiving a request from the network to restart the communications channel and restarting the communications channel.

Various embodiments may include a mobile communication device configured with processor-executable instructions to perform operations of the methods described above.

Various embodiments may include non-transitory processor-readable media on which is stored processor-executable instructions configured to cause a processor of a mobile communication device to perform operations of the methods described above.

Various embodiments may include a mobile communication device having means for performing functions of the operations of the methods described above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the disclosed systems and methods.

DETAILED DESCRIPTION

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the written description or the claims.

As used herein, the term "mobile communication device" refers to any one or all of cellular telephones, smart phones, personal or mobile multi-media players, personal data assistants, laptop computers, tablet computers, smart books, palm-top computers, wireless electronic mail receivers, multimedia Internet-enabled cellular telephones, wireless gaming controllers, and similar personal electronic devices that includes one or more SIM cards, a programmable processor, memory, and circuitry for connecting to at least one mobile communication network with one or more shared RF resources. Various embodiments may be useful in mobile communication devices, such as smart phones, and so such devices are referred to in the descriptions of various embodiments. However, the embodiments may be useful in any electronic devices that may individually maintain one or more radio access technologies (RATs) that utilize at least one shared RF chain, which may include one or more of antennae, radios, transceivers, etc.

As used herein, the terms "SIM," "SIM card," and "subscriber identification module" are used interchangeably to refer to a memory that may be an integrated circuit or embedded into a removable card, and that stores an International Mobile Subscriber Identity (IMSI), related key, and/or other information used to identify and/or authenticate a multi-standby communication device on a network and enable a communication service with the network. Because the information stored in a SIM enables the mobile communication device to establish a communication link for a particular communication service with a particular network, the term "subscription" is used herein as a shorthand reference to refer to the communication service associated with and enabled by the information stored in a particular SIM as the SIM and the communication network, as well as the services and subscriptions supported by that network, correlate to one another.

As described, cellular networks may communicate data to mobile communication devices through a temporary block flow (TBF). A TBF is a temporary communications channel that is set up for the transmission of data, and each TBF is assigned a unique temporary flow identifier (TFI). The data to be transmitted through a TBF is divided into a set of data blocks, each sequentially numbered with a block sequence number (BSN). The network transmits the set of data blocks in sequential order according to the BSN. Each data block may also have a data value associated with a final block indicator (FBI) flag. This flag is set to zero on all data blocks except the final data block, where it is set to a positive value, such as one. The FBI flag indicates to the mobile communication device that the data block received is the final data block in the TBF.

As described, the mobile communication device uses a receive window to determine the range of data blocks that the mobile communication device expects to receive from the network. Although the network may send the data blocks sequentially, lags in transmission may cause the mobile communication device to receive the data blocks in non-sequential order. The receive window allows the mobile communication device to accept the data blocks even though the data blocks may not arrive in sequential order. The receive window is a range of BSNs that adjusts as the mobile communication device receives data blocks from the network. As the mobile communication device receives data blocks, the mobile communication device may shift the receive window forward. For example, at the beginning of a TBF the BSN range of the receive window may be, for example, 0-512. When the mobile communication device receives data blocks numbered 0-9, the range of the receive window may be shifted forward to 10-522. The mobile communication device accepts data blocks that have BSNs within the receive window range. Any data blocks with BSNs outside of the receive window may not be accepted by the mobile communication device. The receive window may also have a tolerance such that data blocks with BSNs that are close to but outside the receive window are still accepted. For example, if a receive window has a range 10-523 and a tolerance value of 3, the mobile communication device may still accept data blocks that are numbered as low as 7 or as high as 526.

As described, interference from various sources may cause the mobile communication device to miss data blocks or control messages (e.g., a TBF release message, a new downlink assignment message, or a timeslot reconfigure message) sent by the network, which may cause the mobile communication device to stall. For example, if the mobile communication device does not receive the final data block and a TBF release and downlink assignment message, the mobile communication device continues to expect data blocks within the receive window of the current TBF. Meanwhile, the network is transmitting data blocks for a new TBF with the same TFI, with a BSN starting at zero. These data blocks fall outside the receive window (which has usually advanced past zero), so the mobile communication device ignores them. The mobile communication device may stall for a long time as the mobile communication device waits for a data block within the receive window.

A long stall may also occur if the mobile communication device does not receive a timeslot reconfigure message. In this situation, the mobile communication device is still searching for data blocks using the old TFI but the network has assigned a new TFI to the current TBF and is transmitting data using the new TFI, while the old TFI is used by the network to communicate with another device. Thus, the mobile communication device may receive data blocks intended for the other device. The BSN of the data blocks the mobile communication device receives are likely outside of the receive window, so the mobile communication device ignores the data blocks and stalls for a long time as the mobile communication device waits for a data block within the receive window.

In overview, various embodiments provide systems and methods implemented with a processor of a mobile communication device for recovering from stalls when the mobile communication device does not receive control messages from the network indicating a change to the communications channel. When the mobile communication device receives a data block, the mobile communication device processor may determine whether the BSN of the data block is within the receive window being monitored by the processor. When the data block is within the receive window or alternatively within the tolerance of the receive window, the mobile communication device processor may set a stall counter to zero. When the data block is not within the receive window or alternatively not within the tolerance of the receive window, the mobile communication device processor may increment the stall counter. The stall counter may count the number of consecutive data blocks received that are outside of the receive window. The processor may reset the counter whenever the mobile communication device receives a data block within the receive window. When the processor determines that the counter reaches a threshold value, for example 20 or 50 or 100, the mobile communication device processor may perform an abnormal release from the TBF and returns to an idle state. An abnormal release may be a self-release from the TBF on the mobile communication device. In an abnormal release, the mobile communication device may release the TBF before receiving all of the expected data blocks, in contrast to a normal release in which the mobile communication device may release the TBF after receiving all of the expected data blocks. The abnormal release may be triggered when the counter reaches the threshold. The network may then time out, and then may attempt to restart the TBF communication with the mobile communication device. The mobile communication device may receive the request to restart the TBF communication and restart the communication to obtain the data blocks. In this manner, the mobile communication device recovers quickly from a stall caused by missing control messages indicating a change to the TBF. The stall counter places a limit on how many out-of-window data blocks the mobile communication device receives before the mobile communication device informs the network, whereas otherwise the mobile communication device may continue to passively receive out-of-window data blocks and stall for a long time.

Figure 1:
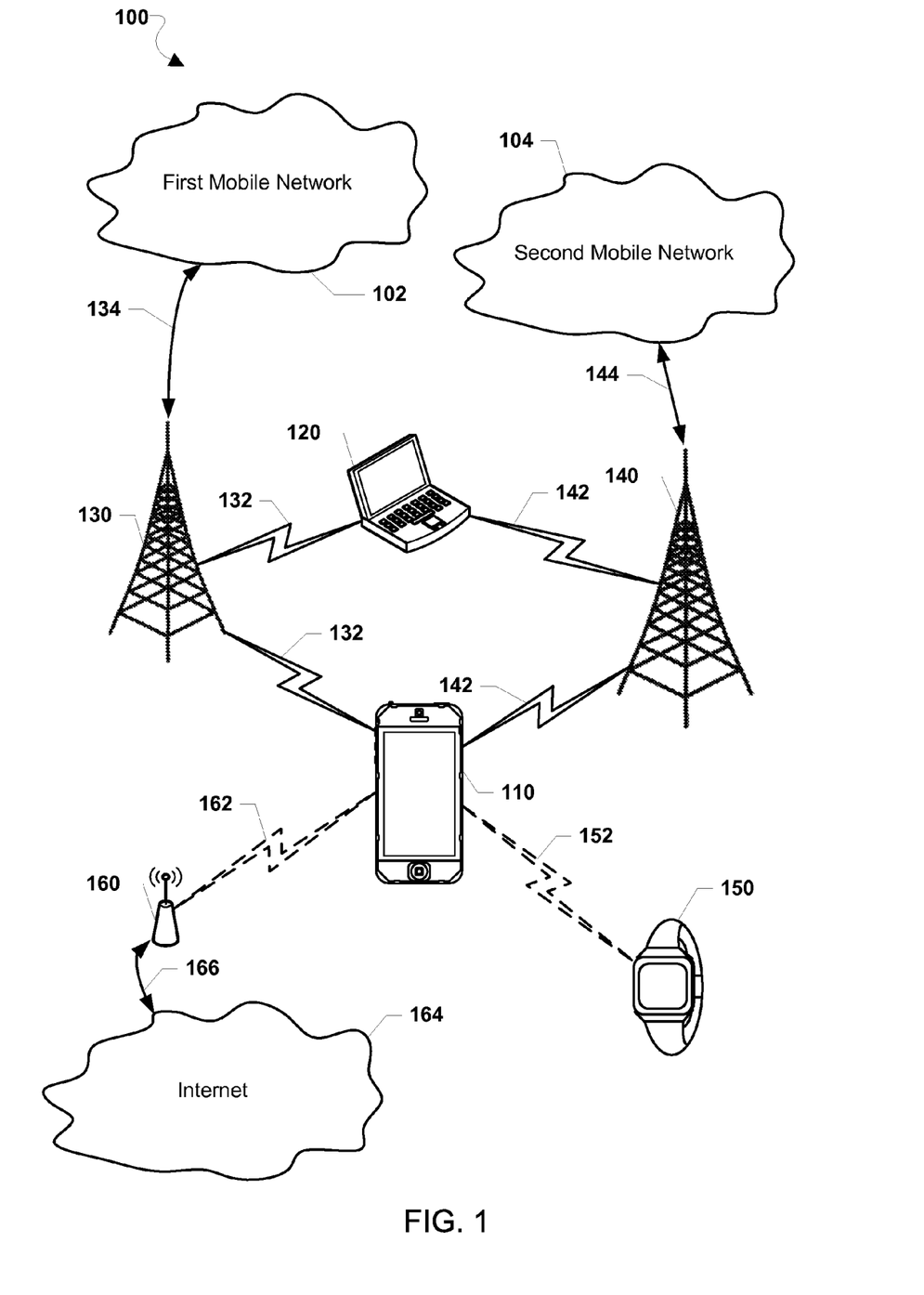
FIG. 1 is a communication system block diagram of mobile telephony networks suitable for use with various embodiments.

Various embodiments may be implemented within a variety of communication systems 100, such as at least two mobile telephony networks, an example of which is illustrated in FIG. 1. A first mobile network 102 and a second mobile network 104 typically each include a plurality of cellular base stations (e.g., a first base station 130 and a second base station 140). A first mobile communication device 110 may be in communication with the first mobile network 102 through a cellular connection 132 to the first base station 130. The first mobile communication device 110 may also be in communication with the second mobile network 104 through a cellular connection 142 to the second base station 140. The first base station 130 may be in communication with the first mobile network 102 over a wired connection 134. The second base station 140 may be in communication with the second mobile network 104 over a wired connection 144.

A second mobile communication device 120 may similarly communicate with the first mobile network 102 through the cellular connection 132 to the first base station 130. The second mobile communication device 120 may also communicate with the second mobile network 104 through the cellular connection 142 to the second base station 140. The cellular connections 132 and 142 may be made through two-way wireless communication links, such as 4G, 3G, CDMA, TDMA, WCDMA, GSM, and other mobile telephony communication technologies.

While the mobile communication devices 110, 120 are shown connected to the first mobile network 102 and, optionally, to the second mobile network 104, in some embodiments (not shown), the mobile communication devices 110, 120 may include two or more subscriptions to two or more mobile networks and may connect to those subscriptions in a manner similar to those described.

In some embodiments, the first mobile communication device 110 may optionally establish a wireless connection 152 with a peripheral device 150 used in connection with the first mobile communication device 110. For example, the first mobile communication device 110 may communicate over a Bluetooth® link with a Bluetooth-enabled personal computing device (e.g., a "smart watch"). In some embodiments, the first mobile communication device 110 may optionally establish a wireless connection 162 with a wireless access point 160, such as over a Wi-Fi connection. The wireless access point 160 may be configured to connect to the Internet 164 or another network over a wired connection 166.

While not illustrated, the second mobile communication device 120 may similarly be configured to connect with the peripheral device 150 and/or the wireless access point 160 over wireless links.

Figure 2:
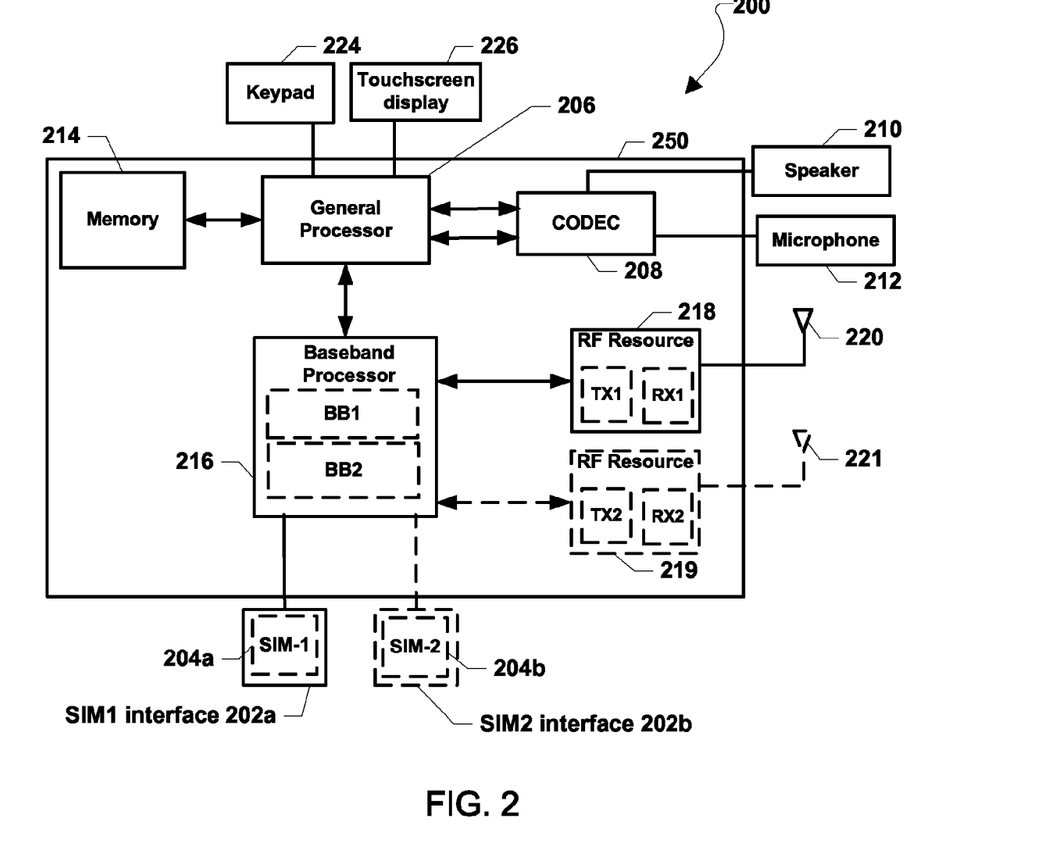
FIG. 2 is a component block diagram of a mobile communication device according to various embodiments.

FIG. 2 is a functional block diagram of a mobile communication device 200 suitable for implementing various embodiments. According to various embodiments, the mobile communication device 200 may be similar to one or more of the mobile communication devices 110, 120 as described with reference to FIG. 1. With reference to FIGS. 1-2, the mobile communication device 200 may include a first SIM interface 202a, which may receive a first identity module SIM-1 204a that is associated with a first subscription. The mobile communication device 200 may also optionally include a second SIM interface 202b, which may receive an optional second identity module SIM-2 204b that is associated with a second subscription.

A SIM in various embodiments may be a Universal Integrated Circuit Card (UICC) that is configured with SIM and/or USIM applications, enabling access to, for example, GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card. A SIM card may have a CPU, ROM, RAM, EEPROM and I/O circuits.

A SIM used in various embodiments may contain user account information, an international mobile subscriber identity (IMSI), a set of SIM application toolkit (SAT) commands, and storage space for phone book contacts. A SIM card may further store home identifiers (e.g., a System Identification Number (SID)/Network Identification Number (NID) pair, a Home PLMN (HPLMN) code, etc.) to indicate the SIM card network operator provider. An Integrated Circuit Card Identity (ICCID) SIM serial number may be printed on the SIM card for identification. However, a SIM may be implemented within a portion of memory of the mobile communication device 200 (e.g., in a memory 214), and thus need not be a separate or removable circuit, chip or card.

The mobile communication device 200 may include at least one controller, such as a general processor 206, which may be coupled to a coder/decoder (CODEC) 208. The CODEC 208 may in turn be coupled to a speaker 210 and a microphone 212. The general processor 206 may also be coupled to the memory 214. The memory 214 may be a non-transitory computer-readable storage medium that stores processor-executable instructions. For example, the instructions may include routing communication data relating to the first or second subscription though a corresponding baseband-RF resource chain.

The memory 214 may store an operating system (OS), as well as user application software and executable instructions. The memory 214 may also store application data, such as an array data structure.

The general processor 206 and the memory 214 may each be coupled to at least one baseband modem processor 216. Each SIM and/or RAT in the mobile communication device 200 (e.g., the SIM-1 204a and/or the SIM-2 204b) may be associated with a baseband-RF resource chain. A baseband-RF resource chain may include the baseband modem processor 216, which may perform baseband/modem functions for communications with/controlling a RAT, and may include one or more amplifiers and radios, referred to generally herein as RF resources (e.g., RF resource 218, 219). In some embodiments, baseband-RF resource chains may share the baseband modem processor 216 (i.e., a single device that performs baseband/modem functions for all RATs on the mobile communication device 200). In other embodiments, each baseband-RF resource chain may include physically or logically separate baseband processors (e.g., BB1, BB2).

The RF resource 218 may be a transceiver that performs transmit/receive functions for each of the SIMs/RATs on the mobile communication device 200. The RF resource 218 may include separate transmit and receive circuitry, or may include a transceiver that combines transmitter and receiver functions. In some embodiments, the RF resource 218 may include multiple receive circuitries. The RF resource 218 may be coupled to a wireless antenna (e.g., a wireless antenna 220). The RF resource 218 may also be coupled to the baseband modem processor 216. In some optional embodiments, the mobile communication device 200 may include an optional RF resource 219 configured similarly to the RF resource 218 and coupled to an optional wireless antenna 221.

In some embodiments, the general processor 206, the memory 214, the baseband processor(s) 216, and the RF resources 218, 219 may be included in the mobile communication device 200 as a system-on-chip 250. In some embodiments, the first and second SIMs 204a, 204b and their corresponding interfaces 202a, 202b may be external to the system-on-chip 250. Further, various input and output devices may be coupled to components on the system-on-chip 250, such as interfaces or controllers. Example user input components suitable for use in the mobile communication device 200 may include, but are not limited to, a keypad 224, a touchscreen display 226, and the microphone 212.

In some embodiments, the keypad 224, the touchscreen display 226, the microphone 212, or a combination thereof, may perform the function of receiving a request to initiate an outgoing call. For example, the touchscreen display 226 may receive a selection of a contact from a contact list or receive a telephone number. In another example, either or both of the touchscreen display 226 and the microphone 212 may perform the function of receiving a request to initiate an outgoing call. For example, the touchscreen display 226 may receive selection of a contact from a contact list or to receive a telephone number. As another example, the request to initiate the outgoing call may be in the form of a voice command received via the microphone 212. Interfaces may be provided between the various software modules and functions in the mobile communication device 200 to enable communication between them, as is known in the art.

Functioning together, the two SIMs 204a, 204b, the baseband processor BB1, BB2, the RF resources 218, 219, and the wireless antennas 220, 221 may constitute two or more radio access technologies (RATs). For example, the mobile communication device 200 may be a SRLTE communication device that includes a SIM, baseband processor, and RF resource configured to support two different RATs, such as LTE and GSM. More RATs may be supported on the mobile communication device 200 by adding more SIM cards, SIM interfaces, RF resources, and antennae for connecting to additional mobile networks.

In some embodiments (not shown), the mobile communication device 200 may include, among other things, additional SIM cards, SIM interfaces, a plurality of RF resources associated with the additional SIM cards, and additional antennae for supporting subscriptions communications with additional mobile networks.

Figure 3:
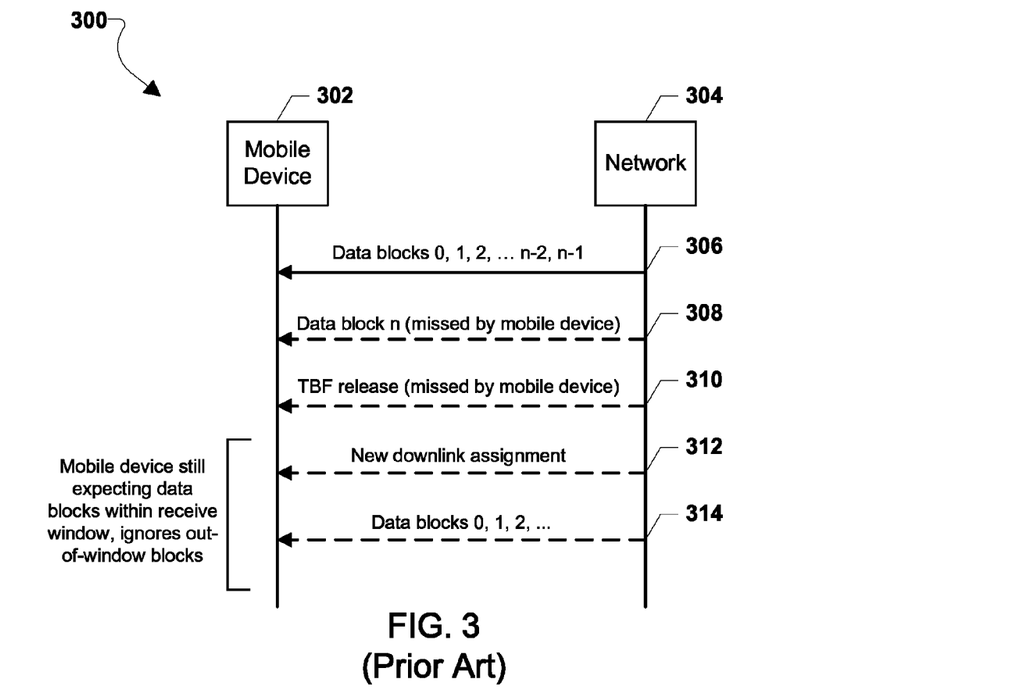
FIG. 3 is a diagram illustrating a stall on a mobile communication device caused by missing a TBF release and new downlink assignment message.

Stalls may occur when a mobile communication device (e.g., 110, 120, 200) does not receive certain control messages from the network indicating a change to a communications channel used to transmit data from the network. FIG. 3 is a communication diagram 300 that illustrates a stall that occurs when the mobile communication device does not receive the final data block and a TBF release and new downlink assignment control message. A TBF release ends the current TBF transmission and the new downlink assignment indicates that a new TBF is starting using the same TFI as the previous TBF. With reference to FIGS. 1-3, a mobile communication device 302, which may be similar to one or more of the mobile communication devices 110, 120, or 200 as described, is in communication with a network 304, which may be similar to one or more of the mobile networks 102, 104 as described.

During a TBF transmission, the network 304 may send sequentially numbered data blocks at transmission 306 to the mobile communication device 302. The total number of data blocks in the TBF transmission is n, and so the BSN for the set of data blocks transmitted may be numbered starting from 0 to n. Once the mobile communication device 302 receives each data block, a processor (e.g., the general purpose processor 206, baseband processor 216, or the like) of the mobile communication device 302 may determine whether the data block is within the receive window or alternatively within a tolerance of the receive window. For example, the range of the receive window may be n−100 to n. The network 304 sends the final data block, numbered n, to the mobile communication device 302 at transmission 308. However, the mobile communication device 302 does not receive the final data block. In the example illustrated in the diagram 300, the mobile communication device 302 receives up to data block n−1 (i.e., only missing the final data block). In this example, the mobile communication device 302 does not receive one or more data blocks, including the final data block. The network 304 transmits a TBF release control message to the mobile communication device 302 at transmission 310, but in this example, the mobile communication device 302 does not receive the transmission 310. Thus in the example illustrated in the diagram 300, the mobile communication device 302 does not receive any information indicating the end of the current TBF session.

The network 304 may send a new downlink assignment for a new TBF with the same TFI at transmission 312. The network 304 begins transmitting data blocks in the new TBF at transmission 314, with BSNs that start with zero and increase sequentially. However, the mobile communication device 302 is still waiting for data blocks in the previous TBF. The new data blocks that the mobile communication device 302 receives during the transmission 314 are not within the receive window or alternatively not within a tolerance of the receive window, and so the mobile communication device 302 may ignore these data blocks. For example, if the range of the receive window is n–100 to n where n is greater than 100, then a BSN of zero is outside of the receive window. The mobile communication device 302 is effectively in a stall as it does not acknowledge any new data blocks it receives because they are outside of the receive window.

Figure 4:
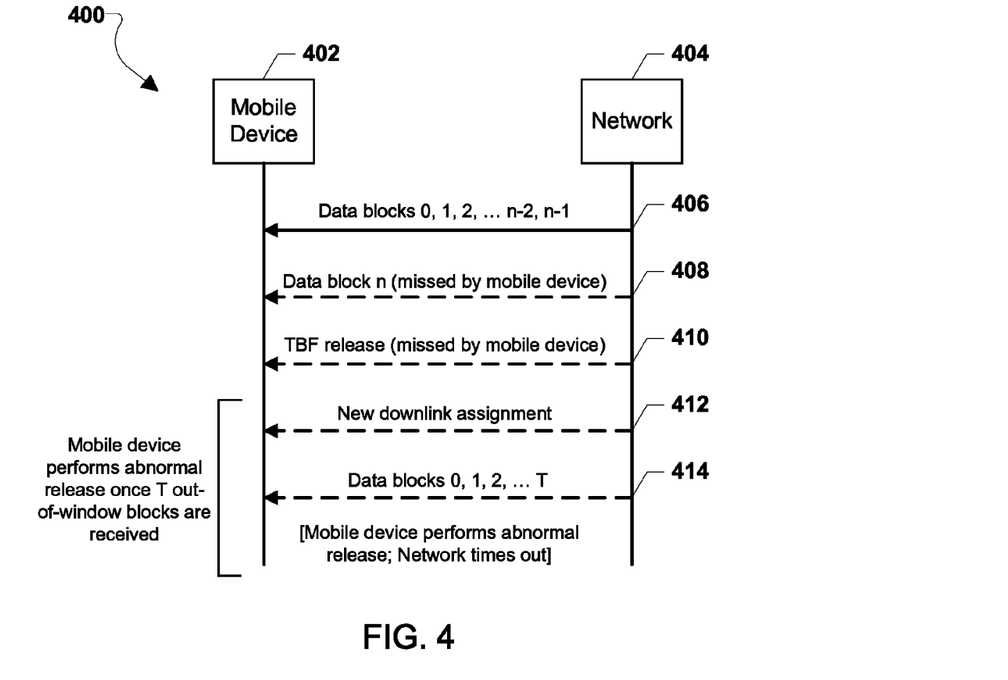
FIG. 4 is a diagram illustrating a method for recovering from a stall on a mobile communication device caused by missing a TBF release and new downlink assignment message according to various embodiments.

FIG. 4 is a communication diagram 400 that illustrates a method for recovering from the stall illustrated in FIG. 3 caused by missing the final data block and TBF release and new downlink assignment control message. With reference to FIGS. 1-4, a mobile communication device 402 in communication with a network 404 may be similar to one or more of the mobile communication devices 110, 120, or 200 as described, and the network 404 may be similar to one or more of the mobile networks 102, 104 as described.

As in the diagram 300, during a TBF transmission, the network 404 may send sequentially numbered data blocks at transmission 406 to the mobile communication device 402. The total number of data blocks in the TBF transmission is n, and so the BSN for the set of data blocks transmitted is numbered starting from 0 to n. Once the mobile communication device 402 receives each data block, the mobile communication device 402 may determine whether the data block is within the receive window or alternatively within a tolerance of the receive window. The network 404 sends the final data block, numbered n, to the mobile communication device 402 at transmission 408. However in the diagram 400, the mobile communication device 402 does not receive the final data block. In the example illustrated in the diagram 400, the mobile communication device 402 receives up to data block n–1 (i.e., only missing the final data block). In this example, the mobile communication device 402 does not receive one or more data blocks, including the final data block. The network 404 transmits a TBF release control message to the mobile communication device 402 at transmission 410, but in this example, the mobile communication device 402 does not receive the transmission 410. Thus in the example illustrated in the diagram 400, the mobile communication device 402 does not receive any information indicating the end of the current TBF session.

The network 404 may send a new downlink assignment for a new TBF with the same TFI at transmission 412. The network 404 begins transmitting data blocks in the new TBF at transmission 414, with BSNs that start with zero and increase sequentially. However, the mobile communication device 402 is still waiting for data blocks in the previous TBF. The new data blocks that the mobile communication device 402 receives during the transmission 414 are not within the receive window or alternatively not within a tolerance of the receive window. Upon determining that the new data blocks are not within the receive window, the mobile communication device 402 increments a stall counter for each out-of-window data block received. If after receiving one or more out-of-window data blocks the mobile communication device 402 receives a data block that is within the receive window or alternatively within a tolerance of the receive window, the mobile communication device may reset the stall counter to zero. Once the stall counter reaches a threshold T, the mobile communication device 402 performs an abnormal release from the previous TBF. An abnormal release may be a self-release from the TBF on the mobile communication device. In an abnormal release, the mobile communication device may release the TBF before receiving all of the expected data blocks, in contrast to a normal release in which the mobile communication device may release the TBF after receiving all of the expected data blocks. The network may also time out after the mobile communication device 402 releases the TBF. The mobile communication device may then receive a request from the network to restart the communications channel and, upon acceptance of the request, restart the communications channel. This prevents a long stall and allows the mobile communication device 402 and the network 404 to restart transmission of the previous TBF.

With reference to FIGS. 1-5, the communication diagram 500 illustrates a stall that occurs when the mobile communication device does not receive a timeslot reconfigure message, as opposed to a TBF release and new downlink assignment message as illustrated in the diagram 300. A timeslot reconfigure message assigns a new TFI to the current TBF transmission. A mobile communication device 502 in communication with a network 504 may be similar to one or more of the mobile communication devices 110, 120, or 200 as described, and the network 504 may be similar to one or more of the mobile networks 102, 104 as described.

Figure 5:
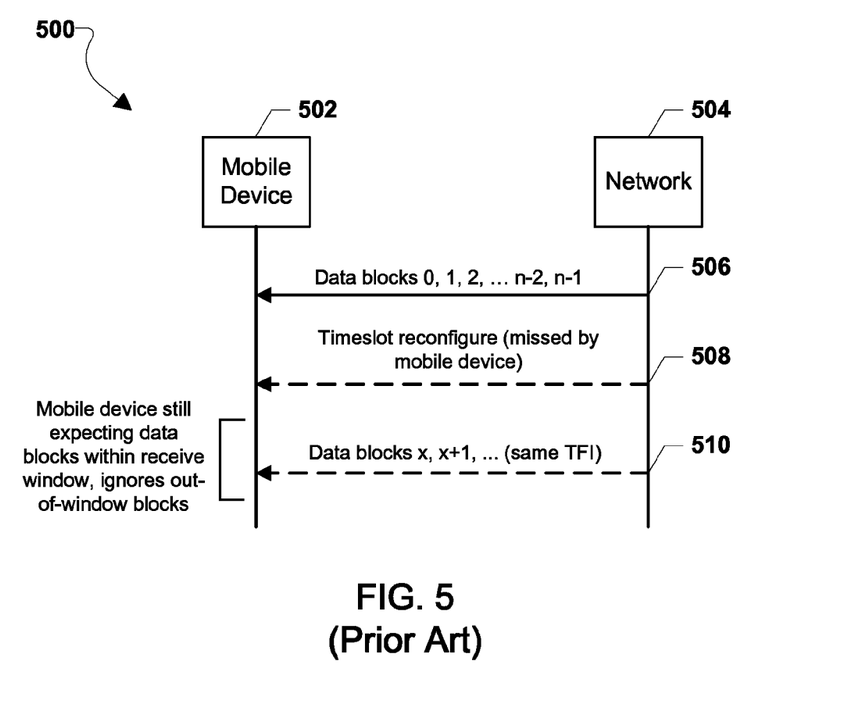
FIG. 5 is a diagram illustrating a stall on a mobile communication device caused by missing a timeslot reconfigure message.

During a TBF transmission, the network 504 may send sequentially numbered data blocks at transmission 506 to the mobile communication device 502. The total number of data blocks in the TBF transmission is n, and so the BSN for the set of data blocks transmitted is numbered starting from 0 to n. Once the mobile communication device 502 receives each data block, it may determine whether the data block is within the receive window or alternatively within a tolerance of the receive window. For example, the range of the receive window may be n–100 to n. The network 304 may transmit a timeslot reconfigure control message to the mobile communication device 502 at transmission 508, but the mobile communication device 502 does not receive the transmission 508. Thus, the mobile communication device 502 does not receive any information indicating that the TFI of the current TBF has changed.

The network 504 may transmit data blocks using the old TFI at transmission 510, which is intended for another device. However, the mobile communication device 502 is still using the old TFI, and so receives the transmission 510 as well. The new data blocks that the mobile communication device 502 receives in transmission 510, numbered x, x+1, etc., are not within the receive window or alternatively not within a tolerance of the receive window, and so the mobile communication device 502 may ignore these data blocks. The mobile communication device 502 is effectively in a stall as it does not acknowledge any new data blocks it receives because they are outside of the receive window.

With reference to FIGS. 1-6, the communication diagram 600 illustrates recovering from the stall illustrated in the diagram 500 caused by missing the timeslot reconfigure control message according to various embodiments. A mobile communication device 602 in communication with a network 604 may be similar to one or more of the mobile communication devices 110, 120, or 200 as described, and the network 504 may be similar to one or more of the mobile networks 102, 104 as described.

Figure 6:
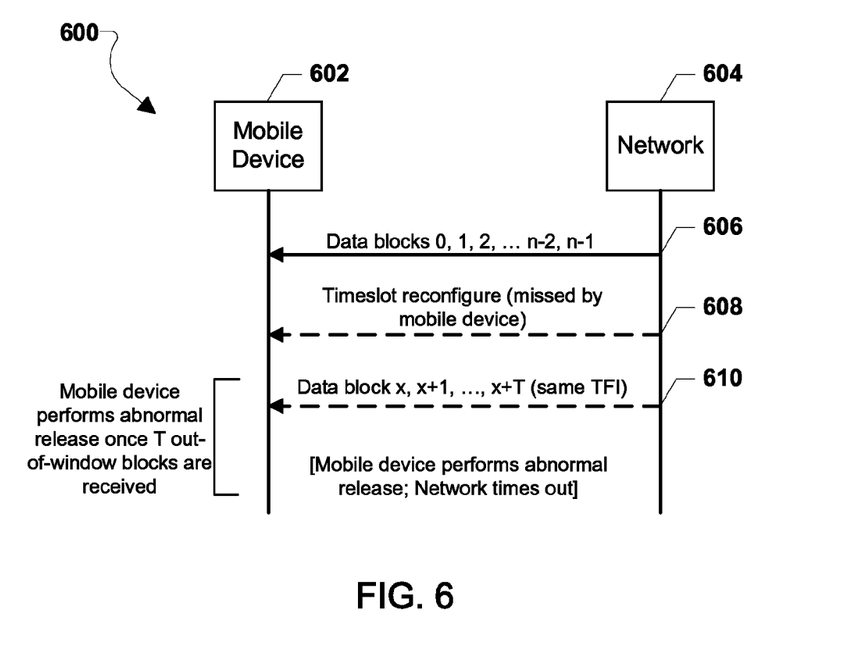
FIG. 6 is a diagram illustrating a method for recovering from a stall on a mobile communication device caused by missing a timeslot reconfigure message according to various embodiments.

As in the diagram 500, during a TBF transmission the network 604 may send sequentially numbered data blocks in transmission 606 to the mobile communication device 602. The total number of data blocks in the TBF transmission is n, and so the BSN for the set of data blocks transmitted is numbered starting from 0 to n. Once the mobile communication device 602 receives each data block, it may determine whether the data block is within the receive window or alternatively within a tolerance of the receive window. For example, the range of the receive window may be n−100 to n. The network 604 may transmit a timeslot reconfigure control message to the mobile communication device 602 at transmission 608, but the mobile communication device 602 does not receive the transmission 608. Thus, the mobile communication device 602 does not receive any information indicating that the TFI of the current TBF has changed.

The network 604 may transmit data blocks using the old TFI at transmission 610, which is intended for another device. However, the mobile communication device 602 is still using the old TFI, and so will receive transmission 610 as well. The new data blocks that the mobile communication device 602 receives in transmission 610, numbered x, x+1, etc., are not within the receive window or alternatively not within a tolerance of the receive window. Upon determining that the new data blocks are not within the receive window, the mobile communication device 602 increments a stall counter for each out-of-window data block it receives. If after receiving one or more out-of-window data blocks the mobile communication device 602 receives a data block that is within the receive window or alternatively within a tolerance of the receive window, the mobile communication device may reset the stall counter to zero. Once the stall counter reaches a threshold T, the mobile communication device 602 performs an abnormal release from the previous TBF. An abnormal release may be a self-release from the TBF on the mobile communication device. In an abnormal release, the mobile communication device may release the TBF before receiving all of the expected data blocks, in contrast to a normal release in which the mobile communication device may release the TBF after receiving all of the expected data blocks. The network may also time out after the mobile communication device 602 releases the TBF. The mobile communication device may then receive a request from the network to restart the communications channel and, upon acceptance of the request, restart the communications channel. This prevents a long stall and allows the mobile communication device 602 and the network 604 to restart transmission of the previous TBF.

As can be seen with reference to diagrams 400 and 600, a mobile communication device may recover from a stall caused by missing a control message indicating a change in the communications channel through the use of a stall counter.

Figure 7:
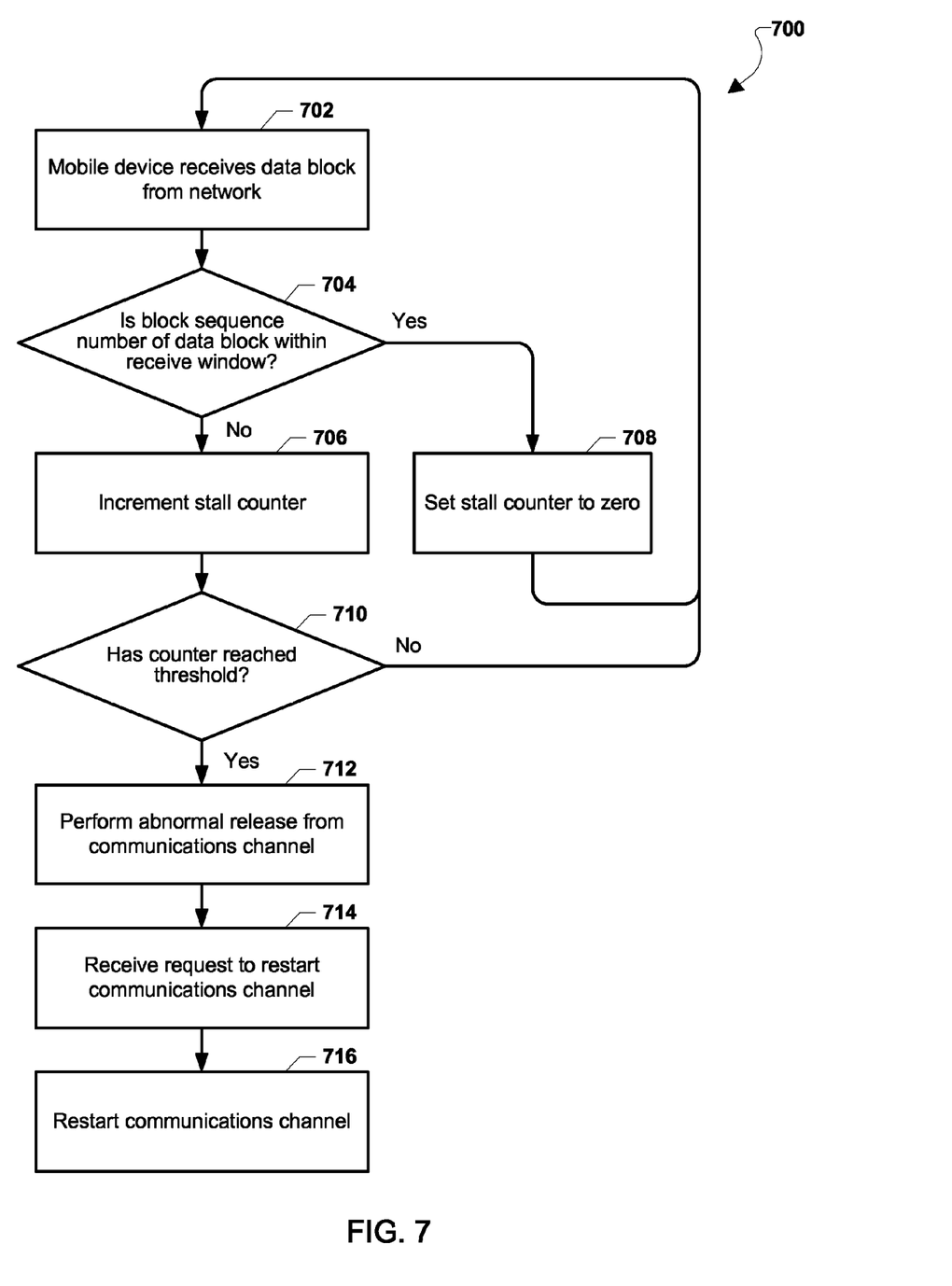
FIG. 7 is a process flow diagram illustrating a method for recovering from stalls on a mobile communication device according to various embodiments.

FIG. 7 illustrates a method 700 for recovering from stalls on a mobile communication device according to various embodiments. The method 700 in FIG. 7 may be implemented with a processor (e.g., the general processor 206 of FIG. 2, a separate controller, and/or the like) of a mobile communication device (e.g., the mobile communication device 200 described with reference to FIG. 2).

With reference to FIG. 1-7, in block 702, the mobile communication device receives a data block from a network. The network uses a communications channel such as a TBF to transmit a set of data blocks to the mobile communication device, where the TBF has a unique TFI. Each data block in the transmitted set of data blocks is assigned a block sequence number. For example, the set of data blocks may be numbered 0, 1, . . . , n−1, n, where n is the total number of data blocks in the TBF transmission.

The mobile communication device may then determine whether the block sequence number of the received data block is within a receive window (or within a tolerance of the receive window) in determination block 704. The receive window is a range of block sequence numbers that the mobile communication device expects to be sent from the network. In response to determining that the block sequence number of the received data block is within the receive window (i.e., determination block 704="Yes"), the mobile communication device accepts the data block and may set a stall counter to zero in block 708. In some embodiments, the stall counter may already equal zero and the mobile communication device does not need to set the stall counter to zero. In some embodiments, the receive window also has an associated tolerance value such that block sequence numbers that are outside of the receive window but within the tolerance value of the receive window may still be accepted by the mobile communication device. After accepting the data block, the mobile communication device waits until the mobile communication device receives another data block from the network in block 702.

In response to determining that the block sequence number of the received data block is outside of the receive window (i.e., determination block 704="No"), the mobile communication device may increment the stall counter by one in block 706. The data block may be outside of the receive window because the mobile communication device did not receive a control message from the network indicating a change in the communications channel. In some embodiments, the control message may be a TBF release and new downlink assignment message, which ends the current TBF transmission and initiates a new TBF with the same TFI. In some embodiments, the control message may be a timeslot reconfigure message, which assigns a new unique TFI to the current TBF. Interference from ambient sources or another RAT on the mobile communication device may cause the mobile communication device not to receive the control message and one or more data blocks sent from the network.

Once the mobile communication device processor has incremented the stall counter, the processor may determine whether the counter has reached a threshold in determination block 710. In response to determining that the counter has not reached a threshold (i.e., determination block 710="No"), the mobile communication device processor waits until the mobile communication device receives another data block from the network in block 702.

In response to determining that the counter has reached a threshold (i.e., determination block 710="Yes"), the mobile communication device processor may perform an abnormal release from the communications channel in block 712. An abnormal release may be a self-release from the TBF on the mobile communication device. In an abnormal release, the mobile communication device may release the TBF before receiving all of the expected data blocks, in contrast to a normal release in which the mobile communication device may release the TBF after receiving all of the expected data blocks. The network may then time out and attempt to restart the communications channel and retransmit the set of data blocks to the mobile communication device. The mobile communication device may receive the request to restart the communications channel in block 714 and, upon accepting the request, the mobile communication device may restart the communications channel in block 716. In this manner, the method 700 enables a mobile communication device to quickly recover from a stall caused by missing a control message from a network indicating a change in the communications channel.

Figure 8:
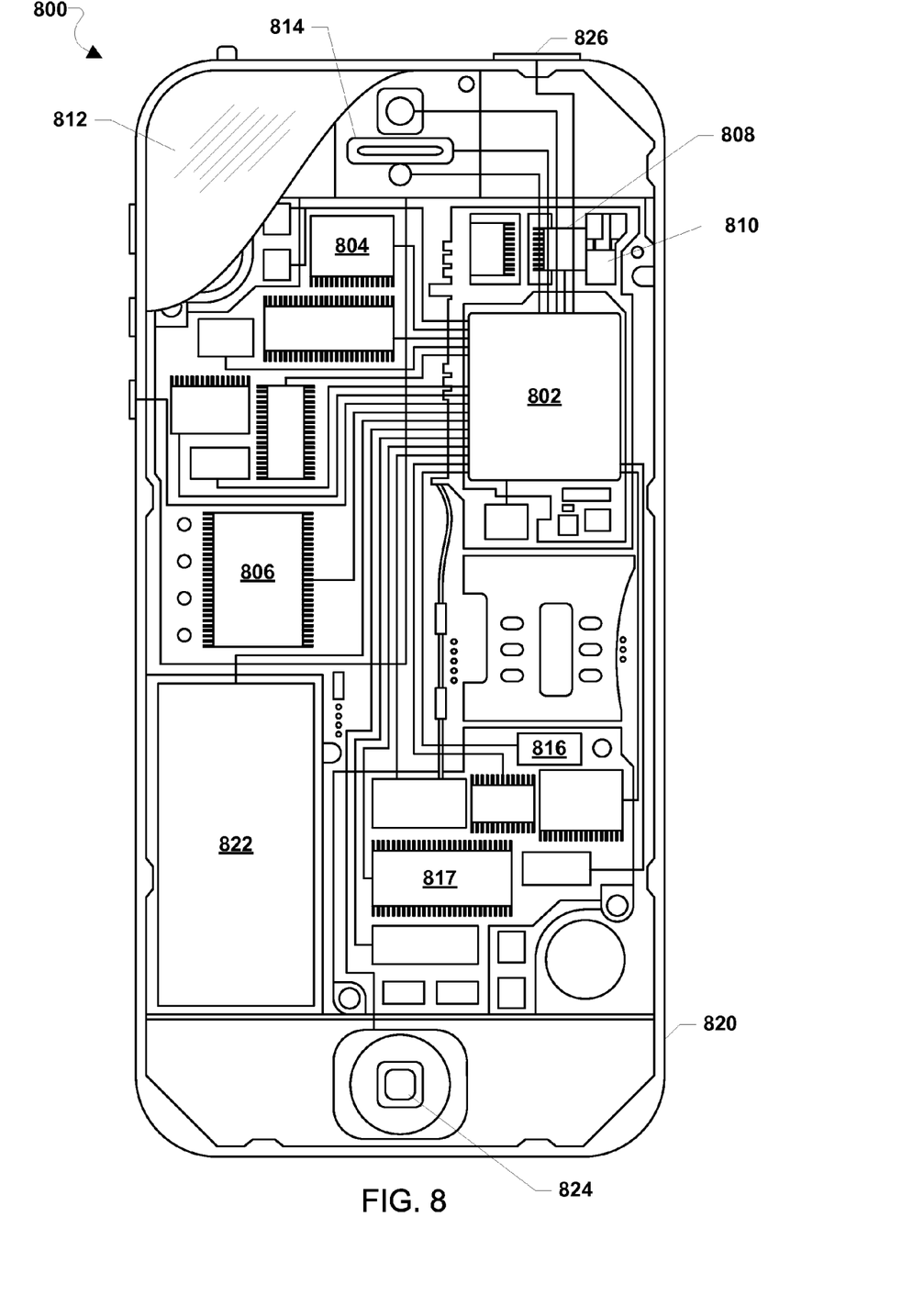
FIG. 8 is a component block diagram of a mobile communication device suitable for implementing some embodiment methods.

Various embodiments may be implemented in any of a variety of mobile communication devices, an example of which (e.g., mobile communication device 800) is illustrated in FIG. 8. According to various embodiments, the mobile communication device 800 may be similar to one or more of the mobile communication devices 110, 120, or 200 as described with reference to FIGS. 1 and 2. As such, the mobile communication device 800 may implement the method 700 in FIG. 7.

Thus, with reference to FIGS. 1-8, the mobile communication device 800 may include a processor 802 coupled to a touchscreen controller 804 and an internal memory 806. The processor 802 may be one or more multi-core integrated circuits designated for general or specific processing tasks. The internal memory 806 may be volatile or non-volatile memory, and may also be secure and/or encrypted memory, or unsecure and/or unencrypted memory, or any combination thereof. The touchscreen controller 804 and the processor 802 may also be coupled to a touchscreen panel 812, such as a resistive-sensing touchscreen, capacitive-sensing touchscreen, infrared sensing touchscreen, etc. Additionally, the display of the mobile communication device 800 need not have touch screen capability.

The mobile communication device 800 may have a cellular network transceiver 808 coupled to the processor 802 and to an antenna 810 and configured for sending and receiving cellular communications. The transceiver 808 and the antenna 810 may be used with the above-mentioned circuitry to implement various embodiment methods. The mobile communication device 800 may include one or more SIM cards 816 coupled to the transceiver 808 and/or the processor 802 and may be configured as described above. The mobile communication device 800 may include a cellular network wireless modem chip 817 that enables communication via a cellular network and is coupled to the processor.

The mobile communication device 800 may also include speakers 814 for providing audio outputs. The mobile communication device 800 may also include a housing 820, constructed of a plastic, metal, or a combination of materials, for containing all or some of the components discussed herein. The mobile communication device 800 may include a power source 822 coupled to the processor 802, such as a disposable or rechargeable battery. The rechargeable battery may also be coupled to the peripheral device connection port to receive a charging current from a source external to the mobile communication device 800. The mobile communication device 800 may also include a physical button 824 for receiving user inputs. The mobile communication device 800 may also include a power button 826 for turning the mobile communication device 800 on and off.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present embodiments.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present embodiments. Various modifications to these embodiments will be readily apparent to those skilled in the art, and the generic principles defined herein may be applied to some embodiments without departing from the spirit or scope of the written description. Thus, the present disclosure is not intended to be limited to the embodiments shown herein but is to be accorded the widest scope consistent with the following claims and the principles and novel features disclosed herein.

What is claimed is:

1. A method for recovering from a stall on a mobile communication device, comprising:
    receiving, on a mobile communication device, a data block from a network through a communications channel, wherein the data block has a block sequence number;
    determining, by the mobile communication device, whether the block sequence number of the data block is within a receive window;
    incrementing, by the mobile communication device, a stall counter when the block sequence number is outside of the receive window; and
    performing, by the mobile communication device, an abnormal release from the communications channel when the stall counter reaches a threshold.

2. The method of claim 1, the method further comprising setting, by the mobile communication device, the stall counter to zero when the block sequence number is within the receive window.

3. The method of claim 1, the method further comprising setting, by the mobile communication device, the stall counter to zero when the block sequence number is within a tolerance value of the receive window.

4. The method of claim 1, the method further comprising incrementing, by the mobile communication device, the stall counter when the block sequence number is outside of a tolerance value of the receive window.

5. The method of claim 1, wherein the communications channel is a temporary block flow.

6. The method of claim 1, the method further comprising:
    receiving, by the mobile communication device, a request from the network to restart the communications channel; and
    restarting the communications channel.

7. The method of claim 1, wherein performing an abnormal release comprises:
    performing a self-release of the communications channel; and
    returning to an idle state.

8. The method of claim 1, wherein performing an abnormal release comprises releasing the communications channel before the mobile communication device receives a plurality of expected data blocks from the network.

9. A mobile communication device, comprising:
    a memory; and
    a processor coupled to the memory and configured with processor executable instructions to:
    receive a data block from a network through a communications channel, wherein the data block has a block sequence number;
    determine whether the block sequence number of the data block is within a receive window;
    increment a stall counter when the block sequence number is outside of the receive window; and
    perform an abnormal release from the communications channel when the stall counter reaches a threshold.

10. The mobile communication device of claim 9, wherein the processor is further configured with processor executable instructions to set the stall counter to zero when the block sequence number is within the receive window.

11. The mobile communication device of claim 9, wherein the processor is further configured with processor executable instructions to set the stall counter to zero when the block sequence number is within a tolerance value of the receive window.

12. The mobile communication device of claim 9, wherein the processor is further configured with processor executable instructions to increment the stall counter when the block sequence number is outside of a tolerance value of the receive window.

13. The mobile communication device of claim 9, wherein the communications channel is a temporary block flow.

14. The mobile communication device of claim 9, wherein the processor is further configured with processor executable instructions to:
    receive a request from the network to restart the communications channel; and
    restart the communications channel.

15. The mobile communication device of claim 9, wherein the processor is further configured with processor executable instructions to perform an abnormal release by:
    performing a self-release of the communications channel; and
    returning to an idle state.

16. The mobile communication device of claim 9, wherein the processor is further configured with processor executable instructions to perform an abnormal release by releasing the communications channel before the mobile communication device receives a plurality of expected data blocks from the network.

17. A non-transitory computer readable storage medium having stored thereon processor-executable software instructions configured to cause a processor of a mobile communication device to perform operations, comprising:
    receiving a data block from a network through a communications channel, wherein the data block has a block sequence number;
    determining whether the block sequence number of the data block is within a receive window;
    incrementing a stall counter when the block sequence number is outside of the receive window; and
    performing an abnormal release from the communications channel when the stall counter reaches a threshold.

18. The non-transitory computer readable storage medium of claim 17, wherein the stored processor-executable software instructions are configured to cause the processor to perform operations further comprising setting the stall counter to zero when the block sequence number is within the receive window.

19. The non-transitory computer readable storage medium of claim 17, wherein the stored processor-executable software instructions are configured to cause the processor to perform operations further comprising setting the stall counter to zero when the block sequence number is within a tolerance value of the receive window.

20. The non-transitory computer readable storage medium of claim 17, wherein the stored processor-executable software instructions are configured to cause the processor to perform operations further comprising incrementing the stall counter when the block sequence number is outside of a tolerance value of the receive window.

21. The non-transitory computer readable storage medium of claim 17, wherein the communications channel is a temporary block flow.

22. The non-transitory computer readable storage medium of claim 17, wherein the stored processor-executable software instructions are configured to cause the processor to perform operations further comprising:
receiving a request from the network to restart the communications channel; and
restarting the communications channel.

23. The non-transitory computer readable storage medium of claim 17, wherein the stored processor-executable software instructions are configured to cause the processor to perform operations such that performing an abnormal release comprises:
performing a self-release of the communications channel; and
returning to an idle state.

24. The non-transitory computer readable storage medium of claim 17, wherein the stored processor-executable software instructions are configured to cause the processor to perform operations such that performing an abnormal release comprises releasing the communications channel before the mobile communication device receives a plurality of expected data blocks from the network.

25. A mobile communication device, comprising:
means for receiving a data block from a network through a communications channel, wherein the data block has a block sequence number;
means for determining whether the block sequence number of the data block is within a receive window;
means for incrementing a stall counter when the block sequence number is outside of the receive window; and
means for performing an abnormal release from the communications channel when the stall counter reaches a threshold.

* * * * *